(12) United States Patent
Wojciak

(10) Patent No.: US 7,064,155 B2
(45) Date of Patent: *Jun. 20, 2006

(54) LUMINESCING AND/OR FLUORESCING RADIATION-CURABLE, CYANOACRYLATE-CONTAINING COMPOSITIONS

(75) Inventor: Stan Wojciak, New Britain, CT (US)

(73) Assignee: Henkel Corporation, Rocky Hill, CT (US)

( * ) Notice: Subject to any disclaimer, the term of this patent is extended or adjusted under 35 U.S.C. 154(b) by 434 days.

This patent is subject to a terminal disclaimer.

(21) Appl. No.: 10/355,037

(22) Filed: Jan. 31, 2003

(65) Prior Publication Data

US 2004/0034116 A1   Feb. 19, 2004

Related U.S. Application Data

(60) Provisional application No. 60/353,963, filed on Feb. 5, 2002.

(51) Int. Cl.
  *C08F 2/46*   (2006.01)

(52) U.S. Cl. .................. 522/173; 522/182; 522/71; 522/18; 522/25; 522/28; 522/29; 522/20; 522/75; 522/81; 522/178; 526/170; 526/171; 526/172; 526/298; 526/319; 156/275.5; 156/275.7; 252/301.16; 524/558

(58) Field of Classification Search ............... 522/71, 522/18, 25, 28, 29, 20, 173, 182, 75; 526/170, 526/171, 172, 298, 319, 3; 156/275.5, 275.7; 252/301.16; 524/558

See application file for complete search history.

(56) References Cited

U.S. PATENT DOCUMENTS

| 3,855,040 | A |   | 12/1974 | Malofsky ............... 156/310 |
|---|---|---|---|---|
| 4,102,945 | A |   | 7/1978 | Gleave ................. 260/879 |
| 4,105,715 | A |   | 8/1978 | Gleave ................. 260/881 |
| 4,440,910 | A |   | 4/1984 | O'Connor .............. 525/295 |
| 4,450,265 | A |   | 5/1984 | Harris ................. 526/298 |
| 4,525,232 | A |   | 6/1985 | Rooney et al. ......... 156/273.3 |
| 4,533,422 | A |   | 8/1985 | Litke ................. 156/307.3 |
| 4,533,446 | A |   | 8/1985 | Conway et al. ......... 204/159.24 |
| 4,581,427 | A | * | 4/1986 | Dunn et al. ........... 526/147 |
| 4,690,957 | A |   | 9/1987 | Fujiokau et al. ........ 522/31 |
| 4,707,432 | A |   | 11/1987 | Gatechair et al. ....... 430/281 |
| RE32,889 | E |   | 3/1989 | Litke ................. 523/212 |
| 4,885,254 | A |   | 12/1989 | Sung ................... 436/85 |
| 5,100,802 | A |   | 3/1992 | Mickols ............... 436/34 |
| 5,182,316 | A |   | 1/1993 | DeVoe et al. .......... 522/99 |
| 5,302,627 | A |   | 4/1994 | Field et al. .......... 522/13 |
| 5,328,944 | A |   | 7/1994 | Attarwala et al. ...... 524/83 |
| 5,525,698 | A |   | 6/1996 | Böttcher et al. ....... 528/92 |
| 5,581,978 | A |   | 12/1996 | Hekal et al. .......... 53/411 |
| 5,652,280 | A |   | 7/1997 | Kutal ................. 522/66 |
| 5,691,113 | A |   | 11/1997 | Kutal ................. 430/274.1 |
| 5,814,180 | A |   | 9/1998 | King .................. 156/333 |
| 5,824,180 | A |   | 10/1998 | Mikuni et al. ......... 156/275.3 |
| 5,877,230 | A |   | 3/1999 | Kutal ................. 522/66 |
| 5,922,783 | A |   | 7/1999 | Wojciak .............. 522/18 |
| 6,127,445 | A |   | 10/2000 | Kutal et al. .......... 522/36 |
| 6,312,644 | B1 |   | 11/2001 | Moriarty et al. ....... 422/14 |
| 6,503,959 | B1 |   | 1/2003 | Nishiyama et al. ...... 522/16 |
| 6,689,826 | B1 | * | 2/2004 | Wojciak .............. 524/107 |
| 6,867,241 | B1 | * | 3/2005 | Wojciak et al. ........ 522/12 |

FOREIGN PATENT DOCUMENTS

| EP | 0 278 685 | 8/1988 |
|---|---|---|
| EP | 0 393 407 | 10/1990 |
| EP | 0 769 721 | 4/1997 |
| WO | WO 98/38260 | 9/1998 |
| WO | WO 01/18068 | 3/2001 |

OTHER PUBLICATIONS

H.V. Coover, D.W. Dreifus and J.T. O'Connor, "Cyanoacrylate Adhesvies" in *Handbook of Adhesives*, 27, 463-77, I. Skeist, ed., Van Nostrand Reinhold, New York, 3rd ed. (1990).

J.G. Woods, "Radiation-Curable Adhesives" in *Radiation Curing: Science and Technology*, 333-98, 371, S.P. Pappas, ed., Plenum Press, New York (1992).

C. Kutal, P.A. Grutsch and D.B. Yang, "A Novel Strategy for Photoinitiated Anionic Polymerization" *Macromolecules*, 24, 6872-73 (1991).

D.B. Yang and C. Kutal, "Inorganic and Organometallic Photoinitiators" in *Radiation Curing: Science and Technology*, 21-55, S.P. Pappas, ed., Plenum Press, New York (1992).

"PRISM" Adhesive 4204, "Beyond a Simple Bond—Benefits of Adhesives Extend to Product and Process", *Design News* (Jan. 20, 1997).

(Continued)

Primary Examiner—James J. Seidleck
Assistant Examiner—Sanza L. McClendon
(74) Attorney, Agent, or Firm—Steven C. Bauman

(57) ABSTRACT

A radiation-curable composition which includes a cyanoacrylate component or a cyanoacrylate-containing formulation; a metallocene component; a photoinitiator; and a luminescent and/or fluorescent dye.

36 Claims, No Drawings

OTHER PUBLICATIONS

"UV Curing: Science & Technology", vol. II, Technology Marketing Corporation, Norwalk, Connecticut, S.P. Pappas, ed., 1-13 (1985).

V.V. Jarikov and D. C. Neckers, "Anionic Photopolymerization of Methyl 2-Cyanoacrylate and Simultaneous Color Formation", Macromolecules 2000, 33, 7761-7764.

* cited by examiner

LUMINESCING AND/OR FLUORESCING RADIATION-CURABLE, CYANOACRYLATE-CONTAINING COMPOSITIONS

This application claims the benefit of Provisional Application No. 60/353,963, filed on Feb. 05, 2002.

BACKGROUND OF THE INVENTION

1. Field of the Invention

The present invention relates to a radiation-curable composition which luminesces and/or fluoresces. The composition includes a cyanoacrylate component or a cyanoacrylate-containing formulation, a metallocene component, a polymerizingly effective amount of a photoinitiator to accelerate the rate of cure, and a luminescent and/or fluorescent dye.

2. Brief Description of Related Technology

Cyanoacrylates generally are quick-setting materials which cure to clear, hard glassy resins, useful as sealants, coatings, and particularly adhesives for bonding together a variety of substrates [see e.g., H. V. Coover, D. W. Dreifus and J. T. O'Connor, "Cyanoacrylate Adhesives" in *Handbook of Adhesives*, 27, 463–77, I. Skeist, ed., Van Nostrand Reinhold, New York, 3rd ed. (1990)].

With conventional polymerizable compositions other than those containing cyanoacrylate monomers, radiation cure generally presents certain advantages over other known cure methods. Those advantages include reduced cure time, solvent elimination (which thereby reduces environmental pollution, and conserves raw materials and energy) and inducement of low thermal stressing of substrate material. Also, room temperature radiation cure prevents degradation of certain heat sensitive polymers, which may occur during a thermal cure procedure.

Radiation-curable, resin-based compositions are legion for a variety of uses in diverse industries, such as coatings, printing, electronic, medical and general engineering. Commonly, radiation-curable compositions are used for adhesives, and in such use the resin may ordinarily be chosen from epoxy- or acrylate-based resins.

Well-known examples of radiation-curable, epoxy-based resins include cycloaliphatic and bisphenol-A epoxy resins, epoxidized novolacs and glycidyl polyethers. [See e.g., U.S. Pat. No. 4,690,957 (Fujiokau) and European Patent Publication EP 278 685.] The common cure mechanism for such radiation-curable epoxy-based compositions is reported to be cationic polymerization.

Well-known examples of radiation-curable, acrylate-based resins include those having structural backbones of urethanes, amides, imides, ethers, hydrocarbons, esters and siloxanes. [See e.g., J. G. Woods, "Radiation-Curable Adhesives" in *Radiation Curing: Science and Technology*, 333–98, 371, S. P. Pappas, ed., Plenum Press, New York (1992).] The common cure mechanism for such radiation-curable, acrylate-based compositions is free-radical polymerization.

European Patent Publication EP 393 407 describes a radiation-curable composition which includes a slow cure cationic polymerizable epoxide, a fast cure free radical polymerizable acrylic component and a photoinitiator. Upon exposure to radiation, the photoinitiator is said to be capable of generating a cationic species which is capable of initiating polymerization of the epoxide and a free radical species which is capable of initiating polymerization of the acrylic component. The polymerizable acrylic component includes monofunctional acrylates and acrylate esters, such as cyanofunctionalized acrylates and acrylate esters, examples of which are expressed as 2-cyanoethyl acrylate ($CH_2$=$CHCOOCH_2CH_2CN$) and 3-cyanopropyl acrylate ($CH_2$=$CHCOOCH_2CH_2CH_2CN$). (See page 5, lines 19–26.) The photoinitiator includes onium salts of Group Va, VIa and VIIa as well as iron-arene complexes, and generally metallocene salts, provided that the material chosen as the photoinitiator is said to be one which is capable of generating both a cationic species and a free radical species upon exposure to radiation. (See page 5, line 56 —page 7, line 15.)

Other reported information regarding photopolymerizable compositions includes formulations containing epoxy compounds and metal complexes, such as is disclosed in U.S. Pat. No. 5,525,698 (Böttcher) and U.S. Pat. No. 4,707,432 (Gatechair).

In D. B. Yang and C. Kutal, "Inorganic and Organometallic Photoinitiators" in *Radiation Curing: Science and Technology*, 21–55, S. P. Pappas, ed., Plenum Press, New York (1992), cyclopentadienyl transition metal complexes are discussed with attention paid to ferrocene and titanocene. In the absence of halogenated media, Yang and Kutal report that ferrocene is photoinert, though in the presence of such media and a vinyllic source free radical initiated polymerization may occur.

In C. Kutal, P. A. Grutsch and D. B. Yang, "A Novel Strategy for Photoinitiated Anionic Polymerization", *Macromolecules*, 24, 6872–73 (1991), the authors note that ethyl cyanoacrylate is "unaffected by prolonged (24-h) irradiation with light of wavelength >350 nm" whereas in the presence of $NCS^-$, cyanoacrylate is observed to solidify immediately, generating heat in the process. Though the $NCS^-$ was not in that case generated as a result of irradiation, it was generated from the Reineckate anion upon ligand field excitation thereof with near-ultraviolet/visible light. See also U.S. Pat. No. 5,652,280 (Kutal) 5,691,113 (Kutal) and U.S. Pat. No. 5,877,230 (Kutal).

International Patent Application PCT/US98/03819 describes photocurable compositions including a cyanoacrylate component, a metallocene component and a photoinitiator component. More specific examples of photoinitiators are claimed in U.S. Pat. No. 5,922,783 (Wojciak).

European Patent Publication No. EP 769 721 A1 describes a photocurable composition of (a) an α-cyanoacrylate and (b) a metallocene compound comprising a transition metal of group VII of the periodic table and aromatic electron system ligands selected from Π-arenes, indenyl, and η-cyclopentadienyl. The photocurable composition may further include (c) a cleavage-type photoinitiator. U.S. Pat. No. 5,814,180 (Mikuni) describes such compositions in the context of a method of bonding artificial nails. These European and U.S. patent documents show in their examples the ineffectiveness of the hydrogen abstraction type of photinitiators in photocurable cyanaocrylate compositions.

International Patent Application PCT/US00/24620 describes photocurable compositions including a cyanoacrylate component, a photoinitiated radical generating component and a photoinitiator component. These compositions are reported to cure through photo-induced free radical polymerization mechanisms.

In some instances irrespective of the chemistry used in the adhesive system, there is a tendency for adhesion failure to occur. In certain of these instances, adhesive failure may be due to improper placement by the end user of adhesive on the substrates to be bonded and/or when the end user does not know when the adhesive has fully cured.

Fluorescing agents have previously been incorporated into curable compositions to provide a non-destructive method of inspection such as identifying cured films, and ensuring proper coating of the composition on an article. These fluorescing agents are typically used in UV/VIS (ultraviolet/visible) curable compositions. Most cyanoacrylate compositions do not require actinic radiation to effect cure.

Other dyes have been incorporated into polymeric compositions generally to color the composition rather than as a cure indicator as there is no color change associated therewith.

U.S. Pat. No. 6,017,983 (Gilleo) appears to refer to the use of a diazo dye that is believed to form a salt or complex with acid anhydrides, which acts as a color indicator for particular anhydride/epoxy resin thermoset adhesives. The resulting salt or complex is reported to produce a chromophoric shift in the dye which is indicative of the amount of acid anhydride present, and hence, the degree of cure. As the epoxy resin cures, the amount of acid anhydride diminishes thus producing a color change. This system appears to be limited to acid anhydride hardeners used to cure epoxy resins.

U.S. Pat. No. 5,302,627 (Field) reports the addition of a dye to UV radiation curable silicone-containing polymeric compositions that contain photoinitiators. Upon exposure to UV radiation, the silicone-containing polymeric composition undergoes a color change indicating that the composition has cured. The dyes used include an anthraquinone dye having a Color Index Solvent Blue 104, 1-hydroxy-4-[(methylphenyl)amino]-9,10-anthracenedione, and an azo dye mixture of azo benzene azo naphthyl benzene amine alkyl/alkoxy derivatives having a Color Index Solvent Blue 99, and azo benzene azo naphthyl benzene amine alkyl derivatives having a Color Index Solvent Red 166. Large amounts of the dye, greater than 30 ppm based on the weight of the composition, are reported to inhibit cure.

And a recent publication [V. V. Jarikov and D. C. Neckers, *Macromolecules*, 33, 7761–64 (2000)] describes the simultaneoius anionic polymerization of methyl 2-cyanoacrylate and color formation with the anions produced by the photoheterolysis of crystal violet leuconitrile and malachite green leucohydroxide blue.

Notwithstanding the state of the technology, it would be desirable to provide a photocurable cyanoacrylate composition that has a built in method of detection or is "self-indicating" when cure has been achieved. Such a physical property enhances the opportunity for the end user to determine that the photocurable composition has been dispensed, in the appropriate amount and in the appropriate location. In addition, in the event that the luminescent dye provides the ability to show a first color in the uncured state and a second color in the cured state, this physical property would be desirable to end users to confirm visually without sophisticated equipment and testing when the composition has reached the cured state.

SUMMARY OF THE INVENTION

The present invention meets the desire expressed above by providing compositions which include a cyanoacrylate component or a cyanoacrylate-containing formulation, a metallocene component, a photoinitiator component, and a dye, which is luminescent and/or fluorescent. Desirably, such compositions are curable after exposure to radiation in the electromagnetic spectrum. Accordingly, in such radiation or photocurable compositions a polymerizingly effective amount of a photoinitiator should be used.

In one aspect of the invention, the luminescent dye provides a first visible color in the uncured state of the composition and a second visible color in the cured state of the composition, thereby conferring a second visual inspection method to determine when a composition has reached the cured state.

In another aspect of the invention, the dye is fluorescent, thereby permitting the end user to determine readily the location on a substrate to be bonded when exposed to appropriate energy conditions.

The inventive compositions retain those benefits and advantages of traditional cyanoacrylate-containing compositions, and certain photocurable cyanoacrylate-containing compositions, while providing to end users the added physical property benefit of confirming visually without sophisticted equipment and testing when the composition has cured.

In another aspect of the present invention, there is provided a method of polymerizing a photocurable composition by providing an amount of the composition to a desired surface and exposing the composition to radiation in an amount sufficient to effect cure thereof.

In yet another aspect of the present invention, there is provided the cured reaction product formed from a photocurable composition after exposure thereof to a curingly effective amount of radiation.

The present invention will be more readily appreciated by those persons of skill in the art based on a reading of the detailed description of the invention which follows and the examples presented thereafter for illustrative purposes.

DETAILED DESCRIPTION OF THE INVENTION

This invention relates to photocurable compositions which include a cyanoacrylate component or a cyanoacrylate-containing formulation, a metallocene component, a polymerizingly effective amount of a photoinitiator, and a luminescent and/or fluorescent dye.

The cyanoacrylate component or cyanoacrylate-containing formulation includes cyanoacrylate monomers which may be chosen with a raft of substituents, such as those represented by $H_2C=C(CN)-COOR$, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2-cyanoacrylate, propyl cyanoacrylates, butyl cyanoacrylates, octyl cyanoacrylates, allyl-2-cyanoacrylate, β-methoxyethyl-2-cyanoacrylate and combinations thereof. A particularly desirable cyanoacrylate monomer for use herein is ethyl-2-cyanoacrylate.

A variety of organometallic materials are also suitable for use herein. Those materials of particular interest herein may be represented by metallocenes within structure I:

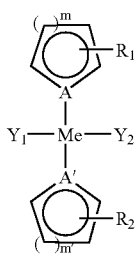

I where $R_1$ and $R_2$ may be the same or different and may occur at least once and up to as many four times on each ring in the event of a five-membered ring and up to as many as five times on each ring in the event of a six-membered ring;

$R_1$ and $R_2$ may be selected from H; any straight- or branched-chain alkyl constituent having from 1 to about 8 carbon atoms, such as $CH_3$, $CH_2CH_3$, $CH_2CH_2CH_3$, $CH(CH_3)_2$, $C(CH_3)_3$ or the like; acetyl; vinyl; allyl; hydroxyl; carboxyl; —$(CH_2)_n$—OH, where n may be an integer in the range of 1 to about 8; —$(CH_2)_n$—$COOR_3$, where n may be an integer in the range of 1 to about 8 and $R_3$ may be any straight- or branched-chain alkyl constituent having from 1 to about 8 carbon atoms; H; Li; Na; or —$(CH_2)_{n'}$, where n' may be an integer in the range of 2 to about 8; —$(CH_2)_n$—$OR_4$, wherein n may be an integer in the range of 1 to about 8 and $R_4$ may be any straight- or branched-chain alkyl constituent having from 1 to about 8 carbon atoms; or —$(CH_2)_n$—$N^+(CH_3)_3 X^-$, where n may be an integer in the range of 1 to about 8 and X may be $Cl^-$, $Br^-$, $I^-$, $ClO_4^-$ or $BF_4^-$;

$Y_1$ and $Y_2$ may not be present at all, but when at least one is present they may be the same or different and may be selected from H, $Cl^-$, $Br^-$, $I^-$, cyano, methoxy, acetyl, hydroxy, nitro, trialkylamines, triaryamines, trialkylphospines, triphenylamine, tosyl and the like;

A and A' may be the same or different and may be C or N;

m and m' may be the same or different and may be 1 or 2; and $M_e$ is Fe, Ti, Ru, Co, Ni, Cr, Cu, Mn, Pd, Ag, Rh, Pt, Zr, Hf, Nb, V, Mo and the like.

Of course, depending on valence state, the element represented by Me may have additional ligands—$Y_1$ and $Y_2$—associated therewith beyond the carbocyclic ligands depicted above (such as where $M_e$ is Ti and $Y_1$ and $Y_2$ are $Cl^-$).

Alternatively, metallocene structure I may be modified to include materials such as:

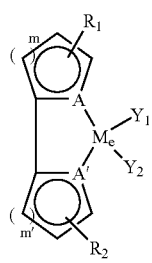

where $R_1$, $R_2$, $Y_1$, $Y_2$, A, A', m, m' and $M_e$ are as defined above. A particularly desirable example of such a material is where $R_1$ and $R_2$ are each H; $Y_1$ and $Y_2$ are each Cl; A and A' are each N; m and m' are each 2 and $M_e$ is Ru.

Within metallocene structure I, well-suited metallocene materials may be chosen from within metallocene structure II:

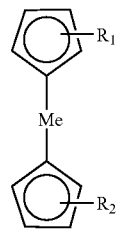

II where $R_1$, $R_2$ and $M_e$ are as defined above.

Particularly well-suited metallocene materials from within structure I may be chosen where $R_1$, $R_2$, $Y_1$, $Y_2$, m and m' are as defined above, and $M_e$ is chosen from Ti, Cr. Cu. Mn, Ag, Zr, Hf. Nb, V and Mo.

Desirably, the metallocene is selected from ferrocenes (i.e., where $M_e$ is Fe), such as ferrocene, vinyl ferrocenes, ferrocene derivatives, such as butyl ferrocenes or diarylphosphino metal-complexed ferrocenes [e.g., 1,1-bis(diphenylphosphino) ferrocene-palladium dichloride], titanocenes (i.e., where $M_e$ is Ti), such as bis($\eta^5$-2,4-cyclopentadien-1-yl)-bis-[2,6-difluoro-3-(1H-pyrrol-1-yl)phenyl] titanium which is available commercially from Ciba Specialty Chemicals, Tarrytown, New York under the tradename "IRGACURE" 784DC, and derivatives and combinations thereof. A particularly desirable metallocene is ferrocene.

And bis-alkylmetallocenes, for instance, bis-alkylferrocenes (such as diferrocenyl ethane, propanes, butanes and the like) are also desirable for use herein, particularly since about half of the equivalent weight of the material (as compared to a non-bis-metallocene) may be employed to obtain the sought-after results, all else being unchanged. Of the these materials, diferrocenyl ethane is particularly desirable.

Of course, other materials may be well-suited for use as the metallocene component. For instance, $M_e[CW_3\text{-CO}$—$CH\!=\!C(O^-)$—$CW'_3]_2$, where $M_e$ is as defined above, and W and W' may be the same or different and may be selected from H, and halogens, such as F and Cl. Examples of such materials include platinum (II) acetyl acetonate ("PtACAC"), cobalt (II) acetyl acetonate ("CoACAC"), nickel (II) acetyl acetonate ("NiACAC") and copper (II) acetyl acetonate ("CuACAC"). Combinations of those materials may also be employed.

A number of photoinitiators may be employed herein to provide the benefits and advantages of the present invention to which reference is made above. Photoinitiators enhance the rapidity of the curing process when the photocurable compositions as a whole are exposed to electromagnetic radiation. Certain metallocenes, such as "IRGACURE" 784DC, may serve a dual purpose as both metallocene and photoinitiator.

Examples of suitable photointiators for use herein include, but are not limited to, photoinitiators available commercially from Ciba Specialty Chemicals, under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819 [bis(2,4,6-trimethyl benzoyl) phenyl phosphine oxide] and "DAROCUR" 1173 (2-hydroxy-2-methyl-1-phenyl-1-propan -1-one) and 4265 (the combination of 2,4,6-trimethylbenzoyldiphenyl-phosphine oxide and 2-hydroxy-2-methyl-1-phenyl-propan-1-one); and the visible light [blue] photoinitiators, dl-camphorquinone and "IRGACURE" 784DC. Of course, combinations of these materials may also be employed herein.

Other photoinitiators useful herein include alkyl pyruvates, such as methyl, ethyl, propyl, and butyl pyruvates, and aryl pyruvates, such as phenyl, benzyl, and appropriately substituted derivatives thereof.

Photoinitiators particularly well-suited for use herein include ultraviolet photoinitiators, such as 2,2-dimethoxy-2-phenyl acetophenone (e.g., "IRGACURE" 651), and 2-hydroxy-2-methyl-1-phenyl-1-propane (e.g., "DAROCUR" 1173), bis(2,4,6-trimethyl benzoyl) phenyl phosphine oxide (e.g., "IRGACURE" 819), and the ultraviolet/visible photoinitiator combination of bis(2,6-dimethoxybenzoyl-2,4,4-trimethylpentyl) phosphine oxide and 2-hydroxy-2-methyl-1-phenyl-propan-1-one (e.g., "IRGACURE" 1700), as well as the visible photoinitiator bis($\eta^5$-2,4-cyclopentadien-1-yl)-bis[2,6-difluoro-3-(1H-pyrrol-1-yl)phenyl]titanium (e.g., "IRGACURE" 784DC).

In addition, hydrogen abstraction photoinitiators may also be used, provided that a hydrogen donor component is used as well. A number of hydrogen abstraction photoinitiators may be employed herein to provide the benefits and advantages of the present invention to which reference is made above. Examples of suitable hydrogen abstraction photoinitiators for use herein include, but are not limited to, benzophenone, benzil (dibenzoyl), xanthone, pentadione, thioxanthrenequinone ("TXAQ"), 2,3-butanedione (diacetyl), phenanthrenequinone ("PAQ"), ethylanthraquinone ("EAQ"), 1,4-chrysenequinone, anthraquinone ("AQ"), camphorquinone ("CQ"), pyrene (benzophenanthrene), benzanthrone and combinations thereof.

The hydrogen donor component ordinarily has one or more labile hydrogens attached to a carbon attached to a heteroatom, such as oxygen, or to point of unsaturation. A variety of such materials may be used in the present invention. For instance, ethers, alcohols and allylic compounds are well suited to donote hydrogen, particularly where the ether and alcohol contain more than one such group per molecule, and the allylic compound has more than one allylic hydrogen. For instance, polyalkylene oxides, polyalkylene (meth)acrylates, polyalkylene di(meth)acrylates, and cyclic ethers (such as tetrahydrofuran and derivatives thereof), and crown ethers are but a few general examples. Specific examples within those groups include polyethylene glycol diacrylate ("PEGDA"), polyethylene glycol dimethacrylate ("PEGDMA"), tetrahydrofuran ("THF"), 18 crown 6 and hydroxyl-terminated polyethylene glycol.

Other examples include calixarenes and oxacalixarenes, silacrowns, cyclodextrins, and various ethoxylated hydric compounds.

In addition, it may be desirable to use cleavage photoinitiators in combination with the hydrogen abstraction photoinitiator.

As the luminescent dye, are those are substantially soluble in and non-reactive with the cyanoacrylate component and do not adversely affect the curing properties of the monomer. Luminescent or fluorescent dyes which adversely affect the storage stability of the cyanoacrylate component are undesirable as well, in particular, those luminescent or fluorescent dyes having a free nitrogen render the cyanoacrylate component unstable. The inventive compositions should exhibit good stability, with a shelf life of greater than about 1 year at or about room temperature. Shelf life is ordinarily determined by heating the compositions in glass tubes at a temperature of 82° C.

The luminescent and/or fluorescent dyes suitable for use in accordance with the present invention are present in an amount sufficient to impart observable color when the composition is cured, such as about 50 to about 2000 ppm, for instance about 100 to about 800 ppm, desirably about 200 to about 400 ppm, based on the amount of the cyanoacrylate.

In one aspect of the invention, the dye should impart fluoresence to the composition, when exposed to a black light. One particularly desirable dye of this sort is fluoranthene, whose chemical structure is shown below.

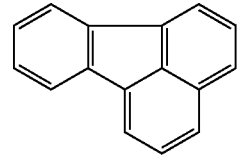

In another aspect of the invention, the luminescent dye should impart one color to the composition when the composition is in the uncured state, and a substantially different color when the composition has been cured. These color differences are readily determinable by visual inspection with the naked eye. Those dyes classified as xanthenes and anthraquinones are desirable for use herein, particularly those which can be readily composition. The viscosity range of the compositions of the present invention may be from about 5 cps to a non-flowable gel.

In one aspect of the invention, and unexpectedly, when the dye is dissolved in the cyanoacrylate component, there is no initial fluorescence and little to no color; however, upon exposure to conditions appropriate for cure, the cured composition fluoresces, as seen under black light, and undergoes a visible color change. The visible color change may be from substantially colorless to red/pink or from yellow/green (which fluoresces under a black light) to substantially colorless. The color change and/or change in fluorescence provides an advantageous cure indicator for the end user to readily determine without the use of sophisticated and expensive detection equipment when the adhesive has substantially cured.

With respect to formulating photocurable compositions, generally the components may be introduced to one another in any convenient order. Alternatively, it may be desirable to prepare a premix of the metallocene component and the photoinitiator component. In this way, a ready made premix of those components may be added to the cyanoacrylate component of the formulation to allow for a quick and easy one-part formulation of a photocurable composition prior to dispensing and curing thereof.

For packaging and dispensing purposes, it may be desirable for photocurable compositions in accordance with the present invention to be relatively fluid and flowable. Variations in the viscosity thereof may also be desirable in certain applications and may be readily achieved through routine changes in formulation, the precise changes being left to those persons of ordinary skill in the art.

For instance, ordinarily cyanoacrylate-containing compositions free from an added thickener or viscosity modifier are low viscosity formulations (such as in the range of 1 to 3 cps). While a composition with such a viscosity (or one whose viscosity has been modified to be up to about five times that viscosity) may be appropriate for a wicking application where a small gap exists between substrates to be bound (e.g., less than about 0.1 mils (0.00254 mm)) and/or an application where enhanced cure speed is desirable, such a viscosity may be too low for convenient use in certain industrial applications. At least for this reason, the viscosity of cyanoacrylate-containing compositions has at times been desirably modified through, for instance, the addition of polymethylmethacrylates and/or fumed silicas. See e.g., U.S. Pat. No. 4,533,422 (Litke) and Re. 32,889 (Litke), the disclosures of each of which are hereby expressly incorporated herein by reference.

A medium viscosity formulation (such as in the range of 100 to 300 cps) may be more appropriate in applications where greater control of flowability is desirable such as bonding together molded polymeric parts. And a high viscosity formulation (such as in the range of 600 to 1000 cps) may be more appropriate in applications involving porous substrates and/or substrates with larger gaps (such as greater than about 0.5 mils (0.0127 mm)).

Of course, those of ordinary skill in the art should make appropriate decisions regarding whether a viscosity modifier should be included in the photocurable composition, and if so which one(s) and at what level should one be included to achieve the desired viscosity for the intended applications.

In addition, it may be desirable to toughen the cured photocurable compositions of the present invention through the addition of elastomeric rubbers such as is taught by and claimed in U.S. Pat. No. 4,440,910 (O'Connor), the disclosure of which is hereby expressly incorporated herein by reference. It may also be desirable to improve the hot strength of the cured photocurable compositions by addition of anhydrides, such as is taught by and claimed in U.S. Pat. No. 4,450,265 (Harris) and the documents cited therein, the disclosures of each of which are hereby expressly incorporated herein by reference.

Moreover, the compositions of the present invention may be rendered into a thixotropic paste through addition of powdered organic fillers having a particle size of about 2 to 200 microns as is taught by U.S. Pat. No. 4,105,715 (Gleave) or thickened by a copolymer or terpolymer resin to improve peel strength as is taught by U.S. Pat. No. 4,102,945 (Gleave), the disclosures of each of which are hereby incorporated herein by reference.

Further, the compositions of the present invention may be rendered more resistant to thermal degradation at elevated temperature conditions by the inclusion of certain sulfur-containing compounds, such as sulfonates, sulfinates, sulfates and sulfites as set forth in U.S. Pat. No. 5,328,944 (Attarwala), the disclosure of which is hereby expressly incorporated herein by reference. The inclusion of such compounds in the photocurable compositions of the present invention renders those compositions well-suited for applications in which elevated temperature conditions may be experienced, such as with potting compounds particularly where large cure through volume is present and non-tacky surfaces are desirably formed in less than about five seconds.

The inclusion of such materials to a photocurable composition in accordance with the present invention may provide a formulation having particular advantages for certain applications, and at least in the case of viscosity modifiers should be appealing from a safety perspective as the possibility is decreased of splashing or spilling the composition on exposed skin of the user or bystanders. In addition, since the parts to be bonded with the inventive compositions are fixed by exposure to UV radiation, there is less of a chance for the assembler to touch or contact an uncured fillet.

The relative amount of the various components of the photocurable compositions according to this invention is a matter of choice left to those persons of skill in the art, depending of course on the identity of the particular components chosen for a specific composition. As a general guide, however, it is desirable to include in the photocurable compositions a metallocene, such as ferrocene, in an amount within the range of about 0.005% to about 4% or greater (desirably within the range of about 0.01% to about 2%) by weight of the total composition. It is also desirable for the compositions to include a photoinitiator, such as "IRGACURE" 1700 or 819, or "DAROCUR" 1173, in an amount within the range of about 0.125% to about 10% by weight of the composition, with about 0.5% to about 4% or greater by weight of the total composition being desirable. The balance of the composition is composed predominantly of a cyanoacrylate component, such as ethyl-2-cyanoacrylate. Of course, the amount of all the components together in the composition totals 100%.

While the inventive luminescent and/or fluorescent photocurable cyanoacrylate compositions may include a variety of recited components in various ranges, a particularly desirable formulation using a cleavage photoinitiator is based on ethyl-2-cyanoacrylate, stabilized with 35 ppm boron trifluoride, 0.01% ferrocene, and 0.5% cleavage photinitiator, such as "IRGACURE" 819, by weight of the total composition and one using instead of the cleavage photoinitiator a hydrogen abstraction photoinitiator and a hydrogen donor component, such as 0.5% PAQ and 2.0% PEGDA, respectively, by weight of the total composition.

A method of curing a self-indicating photocurable cyanoacrylate composition in accordance with this invention is also provided herein, the steps of which include (a) providing onto a desired substrate an amount of a photocurable composition; and (b) subjecting the composition to radiation sufficient to effect cure thereof.

The amount of self-indicating photocurable cyanoacrylate composition provided should be sufficient to cure and form an adequate bond to the substrate surfaces between which it is applied. For instance, application of the self-indicating photocurable cyanoacrylate composition may be achieved by dispensing the composition in drop-wise fashion, or as a liquid stream, brush-applied, dipping, and the like, to form a thin film. Application of the self-indicating photocurable cyanoacrylate composition may depend on the flowability or viscosity of the composition. To that end, viscosity modifiers, as noted above, may be included in the composition.

In use, such compositions are desirably readily dispensed onto a portion of a desired surface of a substrate onto which is to be bonded a portion of another substrate. The photocurable composition may be applied to certain portions of the substrate surface or over the entire surface of the substrate to be bonded, depending on the particular application.

The source of radiation emitting electromagnetic waves is selected from ultraviolet light, visible light, electron beam, x-rays, infrared radiation and combinations thereof. Desirably, ultraviolet light is the radiation of choice, with appropriate sources including "H", "D", "V", "X", "M" and "A"

lamps, mercury arc lamps, and xenon arc lamps (such as those commercially available from Loctite Corporation, Rocky Hill, Conn., Fusion UV Curing Systems, Buffalo Grove, Ill. or Spectroline, Westbury, N.Y.); microwave-generated ultraviolet radiation; solar power and fluorescent light sources. Any of these electromagnetic radiation sources may use in conjunction therewith reflectors and/or filters, so as to focus the emitted radiation onto a specific portion of a substrate onto which has been dispensed a photocurable composition and/or within a particular region of the electromagnetic spectrum. Similarly, the electromagnetic radiation may be generated directly in a steady fashion or in an intermittent fashion so as to minimize the degree of heat build-up. Although the electromagnetic radiation employed to cure the photocurable compositions into desired reaction products is often referred to herein as being in the ultraviolet region, that is not to say that other radiation within the electromagnetic spectrum may not also be suitable. For instance, in certain situations, radiation in the visible region of the electromagnetic spectrum may also be advantageously employed, whether alone or in combination with, for instance, radiation in the ultraviolet region. Of course, microwave and infrared radiation may also be advantageously employed under appropriate conditions.

Higher or lower radiation intensities, greater or fewer exposures thereto and length of exposure and/or greater or lesser distances of the source of radiation to the composition may be required to complete curing, depending of course on the particular components of a chosen composition.

More specifically with respect to radiation intensity, the chosen lamp should have a power rating of at least about 100 watts per inch (about 40 watts per cm), with a power rating of at least about 300 watts per inch (about 120 watts per cm) being particularly desirable. Also, since the inclusion of a photoinitiator in the composition may shift the wavelength within the electromagnetic radiation spectrum at which cure occurs, it may be desirable to use a source of electromagnetic radiation whose variables (e.g., wavelength, distance, and the like) are readily adjustable.

During the curing process, the composition will be exposed to a source of electromagnetic radiation that emits an amount of energy, measured in $KJ/m^2$, determined by parameters including: the size, type and geometry of the source; the duration of the exposure to electromagnetic radiation; the intensity of the radiation (and that portion of radiation emitted within the region appropriate to effect curing); the absorbency of electromagnetic radiation by any intervening materials, such as substrates; and the distance the composition lies from the source of radiation. Those persons of skill in the art should readily appreciate that curing of the composition may be optimized by choosing appropriate values for these parameters in view of the particular components of the composition.

To effect cure, the source of electromagnetic radiation may remain stationary while the composition passes through its path. Alternatively, a substrate coated with the photocurable composition may remain stationary while the source of electromagnetic radiation passes thereover or therearound to complete the transformation from composition to reaction product. Still alternatively, both may traverse one another, or for that matter remain stationary, provided that the photocurable composition is exposed to electromagnetic radiation sufficient to effect cure.

Commercially available curing systems, such as the "ZETA" 7200 or 7400 ultraviolet curing chamber (Loctite Corporation, Rocky Hill, Conn.), Fusion UV Curing Systems F-300 B (Fusion UV Curing Systems, Buffalo Grove, Ill.), Hanovia UV Curing System (Hanovia Corp., Newark, N.J.), BlackLight Model B-100 (Spectroline, Westbury, N.Y.) and RC500 A Pulsed UV Curing System (Xenon Corp., Woburn, Mass.), are well-suited for the purposes described herein. Also, a Sunlighter UV chamber fitted with low intensity mercury vapor lamps and a turntable may be employed herein.

The required amount of energy may be delivered by exposing the composition to a less powerful source of electromagnetic radiation for a longer period of time, through for example multiple passes, or alternatively, by exposing the composition to a more powerful source of electromagnetic radiation for a shorter period of time. In addition, each of those multiple passes may occur with a source at different energy intensities. In any event, those persons of skill in the art should choose an appropriate source of electromagnetic radiation depending on the particular composition, and position that source at a suitable distance therefrom which, together with the length of exposure, optimizes transformation. Also, it may be desirable to use a source of electromagnetic radiation that is delivered in an intermittent fashion, such as by pulsing or strobing, so as to ensure a thorough and complete cure without causing excessive heat build-up.

In use, a luminescent and/or flourescent photocurable composition in accordance with the present invention may be dispensed, such as in the form of a thin film or droplet, onto a desired substrate. Substrates onto which the photocurable composition of the present invention may be applied may be chosen from a vast selection of different materials; basically, any material with which cyanoacrylates may be used is suitable as well for use herein. See supra.

Desirable choices among such materials include acrylics, epoxies, polyolefins, polycarbonates, polysulfones (e.g., polyether sulfone), polyvinyl acetates, polyamides, polyetherimides, polyimides and derivatives and co-polymers thereof with which may be blended or compounded traditional additives for aiding processibility or modifying the physical properties and characteristics of the material to be used as a substrate. Examples of co-polymers which may be employed as substrates include acrylonitrile-butadiene-styrene, styrene-acrylonitrile cellulose, aromatic copolyesters based on terephthallic acid, p,p-dihydroxybiphenyl and p-hydroxy benzoic acid, polyalkylene (such as polybutylene or polyethylene) terephthalate, polymethyl pentene, polyphenylene oxide or sulfide, polystyrene, polyurethane, polyvinylchloride, and the like. Particularly, desirable co-polymers include those which are capable of transmitting UV and/or visible radiation. of course, other materials may also be employed as substrates, such as metals, like stainless steel.

The composition-coated substrate may be positioned within an electromagnetic radiation curing apparatus, such as the "ZETA" 7200 ultraviolet curing chamber, equipped with an appropriate source of electromagnetic radiation, such as ultraviolet radiation, at an appropriate distance therefrom, such as within the range of about 1 to 2 inches (2.54 to 5.08 cm), with about 3 inches (7.62 cm) being desirable. As noted above, the composition-coated substrate may remain in position or may be passed thereunder at an appropriate rate, such as within the range of about 1 to about 60 seconds per foot, with about 5 seconds per foot. Such passage may occur one or more times, or as needed to effect cure of the composition on the substrate. The length of exposure may be in the range of a few seconds or less (for one time exposure) to tens of seconds or longer (for either a one time exposure or a multiple pass exposure), if desired, depending on the depth of the composition to be cured and of course on the components of the composition themselves.

A reaction product is also of course provided by the teaching of this invention. The reaction product is formed from photocurable compositions after exposure thereof to electromagnetic radiation sufficient to effect cure of the composition. The reaction product is formed rapidly, and ordinarily and desirably without observed formation of blooming or crazing, see infra.

The reaction product of the photocurable composition may be prepared by dispensing in low viscosity or liquid form a photocurable composition in accordance with present invention onto a substrate and mating that substrate with a second substrate to form an assembly. Thereafter, exposure to electromagnetic radiation on at least one substrate of the assembly for an appropriate period of time should transform the photocurable composition into an adhesive reaction product.

The viscosity of the photocurable composition may be controlled or modified to optimize its dispensability by, in addition to inclusion of an appropriate material to alter the viscosity thereof as noted above, adjusting the temperature of (1) the composition itself, or (2) the substrates on which the composition may be placed to assemble the device. For example, the temperature of the composition or the substrate(s) or combinations thereof may be decreased to increase the viscosity of the composition. In this way, the uniformity on the substrate of the dispensed photocurable composition may be enhanced using lamination techniques, centrifuge techniques, pressure applied from the atmosphere (such as with vacuum bagging), pressure applied from a weighted object, rollers and the like.

Since the photocurable compositions of the present invention cure to form reaction products through, as their description connotes, a photo-initiated mechanism, the composition and the surface of the substrate on which the composition is placed should be exposed to the source of electromagnetic radiation. The choice of substrate may affect the rate and degree at which cure occurs of the photocurable compositions of the present invention. For instance, it is desirable for the substrates to be bonded together to be substantially free of electromagnetic radiation-absorbing capabilities. That is, the greater degree of electromagnetic radiation transmitting capability the substrate possesses, the greater the rate and degree of cure of the composition, all else being equal of course.

Blooming or crazing may be observed when compositions cure into reaction products and the cure itself is incomplete. That is, blooming refers to the evaporation of cyanoacrylate monomer (due to its relatively high vapor pressure) from uncured fillets, the result of which is formation of a precipitate on surfaces adjacent to the bond line which are also observed as a white haze. Crazing refers to the formation of stress cracks on certain synthetic materials, such as polycarbonates, acrylics and polysulfones, due in this instance to the presence thereon of cyanoacrylate monomer.

The result of incomplete curing may be observed with respect to adhesive uses of the photocurable composition as adhesive or cohesive failure of the cured composition when applied to or between substrates. However, with one aspect of the present invention, incomplete curing should be readily recognized through visual inspection without the use of expensive or sophisticated equipment.

Adhesive or cohesive failure may itself be minimized or even eliminated by using electromagnetic radiation transmitting (as contrasted to absorbing) substrates and placing the source of electromagnetic radiation at a strategic location so as to improve the degree of electromagnetic radiation to which the composition on the substrate is exposed. Similarly, additional sources of electromagnetic radiation, or as stated above reflectors which redirect onto desired portions of the substrate stray or errant electromagnetic radiation, may be employed to further enhance cure.

The luminescent and/or fluorescent photocurable compositions of the present invention may be used in far flung manufacturing opportunities.

For instance, a variety of equipment for the medical industry may be manufactured using the inventive compositions, including, but not limited to, needles, tubesets, masks and catheters.

With respect to needles, syringes, lancets, hypodermics, injectors, bodily fluid (such as blood or urine) collector sets, cannula/hub assemblies and cannula/tube assemblies, such as those to be used in connection with dialysis processes are but a few examples of needles for the medical industry which may be manufactured with the composition of this invention.

Generally, in the manufacture of needles for which a cannula is inserted into a cavity within a hub and is to be affixed therein, dispensing a pre-determined amount of the inventive compositions and subjecting the assembly to UV radiation allows a quick fixation which will cure through the shadow area by the ordinary cyanoacrylate anionic cure mechanism to a full-strength bond within 24 hours.

Moreover, with respect to those needle assemblies which aim at being tamper proof and which provide a cap, the inventive composition may be placed at the juncture between the cap and the collar in which may be placed a hub.

In addition, with respect to tubesets, intravenous sets, fluid delivery and withdrawal sets (such as drug delivery and blood withdrawal sets) and suction tubes are but a few examples of tubsets for the medical industry which may be manufactured with the composition of this invention.

In such instances, tubesets and connectors may be assembled with the inventive compositions by inserting one end of the tubing into the appropriate housing of a connector.

Avoiding the use of a primer composition is particularly attractive since solvents used in conventional primer compositions may cause the reaction product formed from conventional reactive adhesive compositions to be brittle and more susceptible to stress cracking. In contrast, the photocurable feature of the compositions of this invention allow the parts to become fixtured quickly, thereby permitting the conventional anionic-initiated cyanoacrylate cure mechanism to occur without fear of compromising the integrity of the bond formed.

Also, with respect to masks, anesthesia, face and surgical masks are but a few examples of equipment worn by providers of medical services, which may be manufactured with the composition of this invention.

And, with respect to catheters, angioplast and balloon-type catheters are but a few examples of types of catheters, which may be manufactured with the compositions of this invention.

Of course, other applications for the compositions of the present invention exist beyond those specifically exemplified above and are contemplated within the scope thereof, including, but not limited to, silk screening or disc drive applications; holographic applications where a phase hologram is prepared for optical information storage; magnetic sensor applications for door/window alarms where the magnet is bonded to the sensor housing using the inventive compositions so that the dead space within the housing is filled; attaching gauge needles to support posts (e.g., in automotive applications); bonding together cardboard holding cartridges for batteries; loud speaker assembly [see e.g., in the context of Loctite "PRISM" Adhesive 4204, "Beyond a Simple Bond—Benefits of Adhesives Extend to Product and Process", *Design News* (Jan. 20, 1997)] for which the inventive compositions may be used in at least five aspects of the assembly—attaching the spider (which aligns the voice coil to the magnet) to the frame, attaching the surround (which is connected to the case) to the frame, tacking the lead wires, attaching the dust cap to the cone, and attaching the voice coil to the spider and the cone; lens bonding applications; applications where blooming and crazing would be aesthetically unacceptable from a commercial perspective, such as in jewelry fabrication and repair applications where use of a thick fillet of cured material (such as a reaction product of the inventive compositions) would be desirable for structural mounting; electronic potting applications; and other applications where it would be desirable to obviate the need for the use of a primer material (which may be costly, contain an ozone-depleting material and/or may complicate the assembly process), for instance, the fastening of electronic wire tacking, and the like.

Also, electronic applications where outgassing is a conventional recurring problem may employ the photocurable compositions of this invention to decrease the heating time required to obtain a fully-cured reaction product of the composition, thereby decreasing outgassing which may occur.

Accordingly, the compositions of this invention provide a number of benefits and advantages. These include: a "self-indicating" cure detection mechanism and/or a qualitative location and amount detection mechnaism; a built-in secondary cure system (i.e., photo-initiation in addition to the ordinary cyanoacrylate anionic initiation), which is particularly attractive in those applications where certain of the substrates which may be used in the assembly do not allow the transmission of light, rendering another type of adhesive (such as a dual cure acrylic adhesive) less desirable because a secondary heating step would then be required; elimination of a substrate primer step, which obviates the use of often flammable materials and invites automated processes; and improves the cure though gap.

In view of the above description of the present invention, it is evident that a wide range of practical opportunities is provided by the teaching herein. Certain of those practical opportunities are exemplified below, as are many of the advantages and benefits of the present invention. However, the invention as so exemplified is for illustrative purposes only and is not to be construed in any way as limiting the broad aspects of the teaching herein provided.

EXAMPLES

Example 1

A photocurable composition in accordance with the present invention was prepared from about 95.9 grams of ethyl-2-cyanoacrylate, about 0.01 grams of ferrocene, about 0.5 grams of "IRGACURE" 819 as a photoinitiator, about 3.5 grams of polymethyl methacrylate and a fluorescent dye. In one sample 1,000 ppm of fluoranthene was used (Sample No. 1) as the fluorescent dye, and in a second sample 2,000 ppm of fluoranthene was used (Sample No. 2). Typically, commercially available photocurable cyanoacrylate-containing compositions (such as "FLASHCURE" Adhesive 4304, commercially available from Loctite Corporation, Rocky Hill, Conn.) are stabilized against premature anionic polymerization by the addition of an acidic material, such as boron trifluoride or methane sulfonic acid. In this example, therefore, the ethyl-2-cyanoacrylate contained about 35 ppm of boron trifluoride as an acid anionic stabilizer. Of course, greater or lesser amounts of boron triflouride or other acidic anionic stabilizers may be added for such purpose. As a control, "FLASHCURE" Adhesive 4304 was used.

The components were added directly to a polyethylene vessel and mixed for a period of time of about ten minutes at room temperature. The so-formed compositions (Sample Nos. 1 and 2) fluoresced when exposed to a black light.

Once the fluorescing photocurable compositions were prepared, a drop or bead (about 0.2 grams) thereof was dispensed using a polyethylene pipet onto an UV transmitting glass shade (whose dimensions were about 1×1×0.25 inches (2.54×2.54×0.63 cm). The composition-coated substrates were introduced into a "ZETA" 7200 ultraviolet curing chamber, equipped with a five inch (12.7 cm) medium pressure mercury arc lamp (emitting light at about 168 mWatts/cm$^2$ and of a wavelength of about 300 to 365 nm) at a distance from the lamp of about 2 to 3 inches 5.08 cm to 7.62 cm), and exposed to the UV light emitted by the lamp for a period of time of from about 5 to about 15 seconds.

After the indicated exposure time, the once-liquid composition was observed to have cured into a solid reaction product. The solid reaction product fluoresced when exposed to a black light.

The tack free time—that is, the time to cure a bead of adhesive until it is dry to the touch—was determined to be about 5 seconds for Sample No. 1, about 6 seconds for Sample No. 2, and about 2–3 seconds for the control.

Fluorescence—observed as a clear-white color—was measured in each instance, as noted above, using a black light. More specifically, to quantify the amount of fluorescence, a SICK Detector LUT1-530, with an LED meter capable of reading 0 to 20 milliAmps (mA) at 365 nm, having a UV-A fluorescent tube is used.

Example 2

A base photocurable cyanoacrylate was used to formulate a number of fluorescent versions thereof. The base photocurable cyanoacrylate included the following components in the noted amounts:

| Base Photocurable Cyanoacrylate Component: | |
|---|---|
| Component | Amt (Wt. %) |
| Ethyl cyanoacrylate monomer | >95.9% |
| Ferrocene | 100 ppm |
| "IRGACURE" 819 | 0.5% |
| Polymethyl methacrylate | 3.5% |
| BF$_3$ | 35 ppm |

*based on a weight of the ethyl cyanoacrylate monomer

Example 3

To the base photocurable cyanoacrylate component was added 200 ppm D&C Red #27. The mixture was mixed for 5 minutes, to form a visually clear, color-free semi-gel, a portion of which was cured on a glass slide in a "ZETA" 7200 UV chamber for 5 to 15 seconds at room temperature. After cure, the composition exhibited a pink color. In addition, the cured composition was observed to fluoresce under black light. Again, a SICK Detector LUT1-530 is used to quantify the fluorescent response.

Example 4

To the base photocurable cyanoacrylate component was added 400 ppm D&C Red #27. The mixture was centrifuged for 5 minutes at 1150 rpm to form a clear, visually color-free semi-gel, a portion of which was cured on a glass slide in a "ZETA" 7200 UV chamber for 5 to 15 seconds at room temperature. After cure, the composition exhibited a pink color. In addition, the cured composition was observed to fluoresce under a black light. A SICK Detector LUT1-530 is used to quantify the fluorescent response.

Example 5

To the base photocurable cyanoacrylate component was added 800 ppm D&C Red #27. The mixture was centrifuged for 5 minutes at 1150 rpm to form a clear, visually color-free semi-gel, a portion of which was cured on glass slides in a "ZETA" 7200 UV chamber for 5 to 15 seconds at room temperature. After cure, the composition exhibited a pink color. In addition, the cured composition was observed to fluoresce under a black light. A SICK Detector LUT1-530 is used to quantify the fluorescent response.

The present invention provide a means for indicating the precense and location on a substrate of the inventive composition and/or when substantially full cure of the inventive composition has been achieved.

While the present invention has been exemplified as shown above, it is clear that variations are also intended to be within the spirit and scope of the present invention and may be practiced in accordance herewith, with only routine, rather than undue, experimentation. Any variations and equivalents should provide suitable, if not comparable results, when viewed in connection with the results obtained from the above examples. Accordingly, such variations and equivalents are also intended to be encompassed by claims which follow.

What is claimed is:

1. A composition comprising:
   (a) a 2-cyanoacrylate component,
   (b) a metallocene component,
   (c) a photoinitiator component, and
   (d) a luminescent dye.

2. The composition according to claim 1, wherein the luminescent dye provides a first color to the composition in the uncured state and a second color to the composition in the cured state.

3. The composition according to claim 1, wherein the luminescent dye provides fluoresence to the composition.

4. The composition according to claim 1, which includes a polymerizingly effective amount of the photoinitiator component to render it photocurable upon exposure to electromagnetic radiation.

5. The composition according to claim 1, wherein the cyanoacrylate component includes a cyanoacrylate monomer represented by $H_2C=C(CN)-COOR$, wherein R is selected from the group consisting of $C_{1-15}$ alkyl, alkoxyalkyl, cycloalkyl, alkenyl, aralkyl, aryl, allyl and haloalkyl groups.

6. The composition according to claim 1, wherein the cyanoacrylate monomer is selected from the group consisting of methyl cyanoacrylate, ethyl-2-cyanoacrylate, propyl cyanoacrylates, butyl cyanoacrylates, octyl cyanoacrylates, allyl-2-cyanoacrylate, β-methoxyethyl-2-cyanoacrylate and combinations thereof.

7. The composition according to claim 1, wherein the cyanoacrylate monomer is ethyl-2-cyanoacrylate.

8. The composition according to claim 1, wherein the metallocene component includes materials within the following structure:

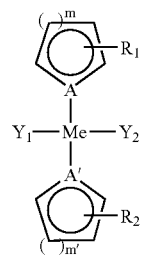

wherein $R_1$ and $R_2$ may occur at least once on each ring, may be the same or different and may be selected from H; any straight- or branched-chain alkyl constituent having from 1 to about 8 carbon atoms; acetyl; vinyl; allyl; hydroxyl; carboxyl; $-(CH_2)_n-OH$, wherein n may be an integer in the range of 1 to about 8; $-(CH_2)_n-COOR_3$, wherein n may be an integer in the range of 1 to about 8 and $R_3$ may be H; Li; Na; any straight- or branched-chain alkyl constituent having from 1 to about 8 carbon atoms; $-(CH_2)_{n'}$, wherein n' may be an integer in the range of 2 to about 8; $-(CH_2)_n-OR_4$, wherein n may be an integer in the range of 1 to about 8 and $R_4$ may be any straight- or branched-chain alkyl constituent having from 1 to about 8 carbon atoms; and $-(CH_2)_n-N^+(CH_3)_3$ $X^-$, wherein n may be an integer in the range of 1 to about 8 and X may be selected from $Cl^-$, $Br^-$, $I^-$, $ClO_4^-$ and $BF_4^-$;

$Y_1$ and $Y_2$ may or may not be present, but when present at least once may be the same or different and may be selected from H, $Cl^-$, $Br^-$, $I^-$, cyano, methoxy, acetyl, hydroxy, nitro, trialkylamines, triaryamines, trialkylphospines, triphenylamine, and tosyl;

A and A' may be the same or different and may be C or N;

m and m' may be the same or different and may be 1 or 2; and $M_e$ is selected from Fe, Ti, Ru, Co, Ni, Cr, Cu, Mn, Pd, Ag, Rh, Pt, Zr, Hf, Nb, V and Mo.

9. The composition according to claim 1, wherein the metallocene component includes materials within the folowing structure:

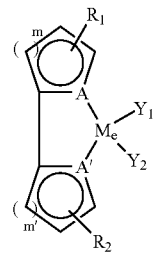

wherein $R_1$ and $R_2$ may occur at least once on each ring, may be the same or different and may be selected from H; any straight- or branched-chain alkyl constituent having from 1 to about 8 carbon atoms; acetyl; vinyl; allyl; hydroxyl; carboxyl; —$(CH_2)_n$—OH, wherein n may be an integer in the range of 1 to about 8; —$(CH_2)_n$—$COOR_3$, wherein n may be an integer in the range of 1 to about 8 and $R_3$ may be H; Li; Na; any straight- or branched-chain alkyl constituent having from 1 to about 8 carbon atoms; —$(CH_2)_{n'}$, wherein n' may be an integer in the range of 2 to about 8; —$(CH_2)_n$—$OR_4$, wherein n may be an integer in the range of 1 to about 8 and $R_4$ may be any straight- or branched-chain alkyl constituent having from 1 to about 8 carbon atoms; and —$(CH_2)_n$—$N^+(CH_3)_3$ $X^-$, wherein n may be an integer in the range of 1 to about 8 and X may be selected from $Cl^-$, $Br^-$, $I^-$, $ClO_4^-$ and $BF_4^-$;

$Y_1$ and $Y_2$ may or may not be present, but when present at least once may be the same or different and may be selected from H, $Cl^-$, $Br^-$, $I^-$, cyano, methoxy, acetyl, hydroxy, nitro, trialkylamines, triaryamines, trialkyiphospines, triphenylamine, and tosyl;

A and A' may be the same or different and may be C or N;

m and m' may be the same or different and may be 1 or 2; and $M_e$ is selected from Fe, Ti, Ru, Co, Ni, Cr, Cu, Mn, Pd, Ag, Rh, Pt, Zr, Hf, Nb, V and Mo.

10. The composition according to claim 7, wherein $R_1$ and $R_2$ are each H; $Y_1$ and $Y_2$ are each Cl; A and A' are each N; m and m' are each 2; and $M_e$ is Ru.

11. The composition according to claim 1, wherein the metallocene is selected from the group consisting of diaryl phosphino metal-complexed ferrocenes, bis-alkyl ferrocenes, and $M_e[CW_3$—CO—CH=C($O^-$)—$CW'_3]_2$, wherein $M_e$ is selected from Fe, Ti, Ru, Ca, Ni, Cr, Cu, Mn, Pd, Ag, Rh, Pt, Zr, Hf, Nb, V and Mo, and W and W' may be the same or different and may be selected from H and halogen.

12. The composition according to claim 1, wherein the metallocene component is a member selected from the group consisting of ferrocenes, titanocenes, and derivatives and combinations thereof.

13. The composition according to claim 1, wherein the metallocene is ferrocene.

14. The composition according to claim 1, wherein the photoinitiator component is selected from the group consisting of 1-hydroxycyclohexyl phenyl ketone, 2-methyl-1-[4- (methylthio)phenyl]-2-morpholino propan-1-one, benzophenone, 2-benzyl-2-N,N-dimethylamino-1-(4-morpholinophenyl) -1-butanone, 2,2-dimethoxy-2-phenyl acetophenone, bis (2,6dimethoxybenzoyl-2,4,4-trimethyl pentyl) phosphine oxide, 2-hydroxy-2-methyl-1-phenyl-propan-1-one, 2,4,6-trimethylbenzoyldiphenyl-phosphine oxide, bis (2,4,6-trimethyl benzoyl) phenyl phosphine oxide, dl-camphorquinone, alkyl pyruvates, aryl pyruvates and combinations thereof.

15. The composition according to claim 1, wherein the photoinitiator is a hydrogen abstraction photoinitiator component, and further comprising a hydrogen donor component.

16. The composition according to claim 15, wherein the hydrogen abstraction photoinitiator component is selected from the group consisting of benzophenone, benzil, xanthone, pentadione, thioxanthrenequinone, 2,3-butanedione, phenanthrenequinone, ethylanthraquinone, 1,4chrysenequinone, anthraquinone, camphorquinone, pyrene, benzanthrone and combinations thereof.

17. The composition according to claim 15, wherein the hydrogen abstraction photoinitiator component includes phenanthrenequinone.

18. The composition according to claim 15, wherein the hydrogen donor component includes ethers, alcohols, allylic compounds and combinations thereof.

19. The composition according to claim 15, wherein the hydrogen donor component includes polyalkylene oxides, polyalkylene (meth)acrylates, polyalkylene di(meth)acrylates, cyclic ethers, crown ethers, calixarenes and oxacalix-arenes, silacrowns, cyclodextrins, ethoxylated hydric compounds, and combinations thereof.

20. The composition according to claim 1, wherein the metallocene component is present in an amount within the range of 0.005% to about 4% by weight.

21. The composition according to claim 1, wherein the photoinitiator component is present in an amount within the range of 0.125% to about 5% by weight.

22. The composition according to claim 15, wherein the hydrogen donor component is present in an amount within the range of 0.125% to about 10% by weight.

23. The composition according to claim 1, wherein the source of electromagnetic radiation is selected from the group consisting of ultraviolet light, visible light, electron beam, x-rays, infrared radiation and combinations thereof.

24. The composition according to claim 1, further comprising a member selected from the group consisting of viscosity-modifying agents, rubber toughening agents, thixotropy rendering agents, thermal-stabilizing agents, and combinations thereof.

25. A method of polymerizing a photocurable composition, said method comprising the steps of:
(a) providing an amount of the composition according to claim 1; and
(b) subjecting the composition to electromagnetic radiation effective to cure the composition.

26. A reaction product formed from the composition according to of claim 1 after exposing the composition to electromagnetic radiation effective to cure the composition.

27. An article assembled with a composition according to claim 1, selected from the group consisting of needles, syringes, lancets, hypodermics, injectors, bodily fluid collector sets, cannula/hub assemblies, cannula/tube assemblies, tube sets, intravenous sets, fluid delivery and withdrawal sets, suction tubes, anesthesia masks, face masks, surgical masks, angioplast catheters, balloon catheters, disc drives, magnetic sensors, battery holding cartridges, loud speakers, phase holograms, lenses and jewelry.

28. A method of using a composition according to claim 1, to manufacture an article selected from the group consisting of needles, syringes, lancets, hypodermics, injectors, bodily fluid collector sets, cannula/hub assemblies, cannula/tube assemblies, tube sets, intravenous sets, fluid delivery and withdrawal sets, suction tubes, anesthesia masks, face masks, surgical masks, angioplast catheters, balloon catheters, disc drives, magnetic sensors, battery holding cartridges, loud speakers, phase holograms, lenses and jewelry.

29. A method of using a composition according to claim 1, to repair an article selected from the group consisting of needles, syringes, lancets, hypodermics, injectors, bodily fluid collector sets, cannula/hub assemblies, cannula/tube assemblies, tube sets, intravenous sets, fluid delivery and withdrawal sets, suction tubes, anesthesia masks, face masks, surgical masks, angioplast catheters, balloon catheters, disc drives, magnetic sensors, battery holding cartridges, loud speakers, phase holograms, lenses and jewelry.

30. The composition according to claim 1, having a viscosity selected from the group consisting of ranges of about 1 to about 15 cps, about 100 to about 300 cps; and about 600 to about 1000 cps.

31. The composition according to claim 27, for use in the manufacture of articles having molded polymeric parts to be bonded together.

32. The composition according to claim 28, for use in the manufacture of articles having porous substrates and/or substrates with gaps greater than about 0.5 mils (0.0127 mm) therebetween.

33. The composition of claim 1, wherein the dye lacks a free nitrogen.

34. The composition of claim 1, wherein the dye is present in an amount of about 50 to about 2000 ppm, based on the amount of the cyanoacrylate.

35. The composition of claim 1, wherein the dye is fluoranthene.

36. The composition of claim 1, wherein the dye is a member selected from the group consisting of xanthenes, anthraquinones and combinations thereof.

* * * * *